July 31, 1928.

L. R. SMITH 1,678,748

VENTILATOR FOR CLOSED CARS

Filed Oct. 17, 1927

Inventor
Leon R. Smith.

By
Attorney

Patented July 31, 1928.

1,678,748

UNITED STATES PATENT OFFICE.

LEON RANSOM SMITH, OF ENGLEWOOD, COLORADO.

VENTILATOR FOR CLOSED CARS.

Application filed October 17, 1927. Serial No. 226,805.

This invention relates to improvements in ventilators for closed cars.

The closed automobile has become very popular, but experience has shown that when the windows are closed, the air very quickly becomes vitiated to such an extent that it becomes uncomfortable for the occupants of the car. In order to maintain the air within the automobile suitable for respiration, it is necessary to provide for ventilation. This has ordinarily been achieved by opening one or more of the windows slightly or by opening a ventilator in the cowl. When an automobile is ventilated in this manner, a strong draft is invariably produced which is highly objectionable and disagreeable.

It is the object of this invention to produce a ventilator of a simple and cheap construction that can be readily applied in the window openings and which will cooperate with the movable glass to form a closure for the opening which shall be provided with openings so arranged that a positive but gentle circulation of air will be maintained whenever the car is in operation.

This invention, briefly described, consists of two metal plates that are provided with longitudinally extending openings that are formed by having a portion of the metal pressed outwardly so as to produce passageways through which the air may flow. One of these plates is secured in the window opening between the felt lining of the groove in which the glass slides and the outer wall of the groove and the other of which is secured in corresponding position on the inside of the felt lining. The openings in the inner plate open in an upward direction while the openings in the outer plate open in a downward direction. The lower edges of these plates are provided with felt strips that are so positioned that they engage the inner and outer surfaces of the glass when the latter is moved up into position between the plates. When the glass is in position with its upper edge projecting a short distance between the lower edges of the plates, air will be permitted to flow through the openings in the plate from the interior to the exterior of the car.

Having thus briefly explained the invention, I will now proceed to describe the same in detail and reference for this purpose will be had to the accompanying drawing in which the preferred embodiment has been illustrated and in which.

Figure 1:
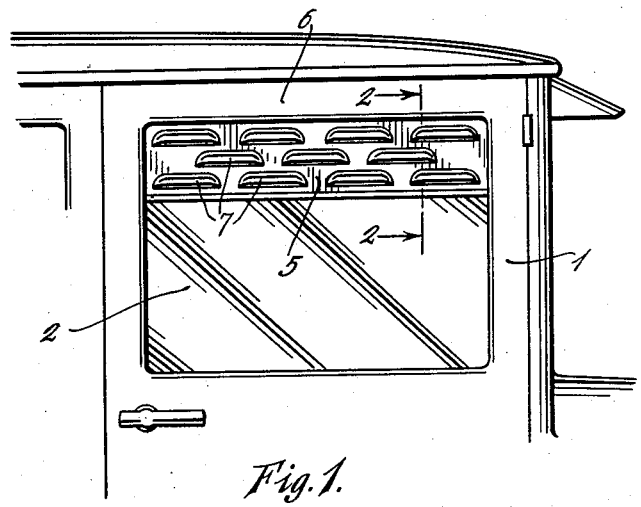
Fig. 1 is a side elevation showing my ventilator plates applied in place in the window opening of an automobile door;

In the drawing numeral 1 represents the frame of the door and 2 the movable glass which serves to close the window opening with which the upper end of the door is provided. The side and top members of the door are provided with grooves 3 which have a felt lining 4. The glass 2 is located between the two sides of the felt lining and a door is usually provided with some suitable means for raising and lowering the glass plate. The means by which the glass plate is raised and lowered will not be described as it has nothing to do with the present invention.

Figure 2:
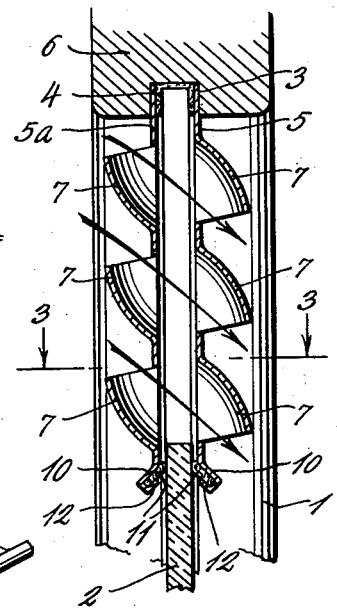
Fig. 2 is a section taken on line 2—2, Fig. 1.
Figure 4:
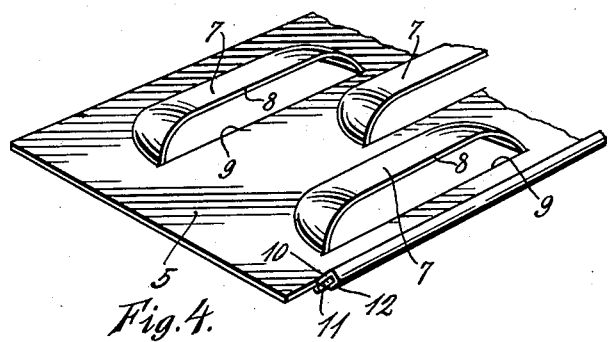
Fig. 4 is a perspective view of a portion of one of my improved ventilating plates.
Figure 3:
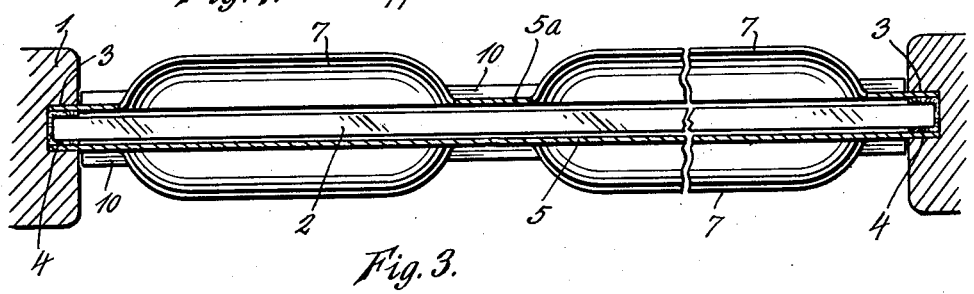
Fig. 3 is a section taken on line 3—3, Fig. 2.

In carrying out my invention I have provided two plates 5 and 5ª which are identical with one minor exception to which attention will hereinafter be called. These plates are of such length that they can be inserted into the window opening and have their ends projecting into the grooves 3 between the wall of the groove and the adjacent side of the felt lining in the manner shown in Figs. 2 and 3. After these plates have been inserted they are moved upwardly so that the upward edge abuts the bottom of the horizontal groove in the transverse member 6 of the door frame. These plates are provided with openings which have been formed by cutting the material for a distance of two or three inches in a direction parallel with the sides of the plate. A portion of the material is then pressed outwardly so as to form a curved wall 7, whose edge 8 is spaced from the corresponding edge 9 of the plate in the manner shown in Fig. 4. In the preferred construction I have provided three rows of these ventilating openings in which the openings are staggered with respect to each other in the manner quite clearly illustrated in Figs. 1 and 4. The plate that is to be used against the outer edge of the groove 3 has the edge below the openings outwardly inclined in the manner indicated by numeral 10 and bent back on itself. A felt strip 11 is clamped between the wall 10 and the wall 12 in the manner shown in Fig. 2. This strip projects inwardly beyond the inner surface of the plate so that when the glass plate 2 is moved upwardly, the free edge of the felt strip will contact with the outer surface of the glass. Plate 5ª is identical with plate 5 with the exception that the outwardly inclined edge 10, instead of being located on the side nearest the openings is located on the opposite side of the plate so that when plate 5ª is put in place with the felt strip 11 extending along its lower edge, the openings will open in an upward direction in the manner shown quite clearly in Fig. 2. These plates are held in place by friction as they are very light and can therefore be put into place and removed without the use of any tool. When the parts are in the position shown in Fig. 2 with the glass plate projecting a short distance upwardly beyond the felt strips 10, air can pass outwardly from the car through the openings in the direction of the arrows. When the car is moving there is always a stream of air flowing rearwardly from the front of the car towards the back, even when the car is passing in the same direction as the air is blowing for the reason that in nearly every case the speed of the automobile is greater than the rate at which the air is moving. This rearward flow of air over the openings in the outer plate, produces a suction that tends to cause air to move outwardly from the interior of the car. This suction is gentle, however, with the result that no strong air currents are set up within the car, but it produces a sufficient movement of the air to keep the interior of the car constantly supplied with fresh air. Owing to the fact that the sides 7 are downwardly inclined on the outer plate, rain or snow will not penetrate as this nearly always comes at a very steep downward angle and therefore has no opportunity to pass upwardly through the openings.

The fact that the corresponding openings on the inner side open upwardly facilitates the removal of the vitiated air which nearly always lies adjacent to the top.

In extremely cold weather or at any other time when it is desirable to close the car as tightly as possible, the glass may be projected upwardly into the upper transverse groove 3 and will therefore close the passageway through the ventilator so that the car body will be closed in the same manner as it would be if my ventilator was not in place.

From the above it will be apparent that I have produced a very simple ventilator that can be readily applied to the window openings of automobiles and which will permit a gradual circulation of the air whenever the car is in motion. These ventilating plates are so constructed that they are held in place by friction alone and therefore can be applied and removed without the use of special tools.

Having described the invention what is claimed as new is:

1. In a member having a window opening provided with grooves along the sides and top, a felt lining strip for each side of the groove and a glass slidable in the grooves, a ventilator consisting of two sheet metal plates having each a plurality of openings, one of said sheets being located on each side of the groove between the side of the groove and the adjacent felt strip whereby the two metal strips are spaced apart so as to permit the glass to be inserted into the space between them.

2. In a member having a window opening provided with grooves along the sides and top, a felt lining strip for each side of the groove and a glass closure slidable in the grooves between the felt strips, a ventilator consisting of two sheet metal plates having each a plurality of louvers extending longitudinally, one of said sheets being located on each side of the groove between the felt strip and the side of the groove whereby a space is provided between the metal strips into which the top of the glass closure may be projected.

3. In a member having a window opening provided with grooves along the sides and top, a felt lining strip for each side of the groove, and a glass closure slidable in the grooves between the felt strips, a ventilator consisting of two sheet metal plates having each a plurality of louvers extending longitudinally, one of said sheets being located on each side of the groove between the felt strip and the side of the groove whereby a space is provided between the metal strips into which the top of the glass closure may be projected, the lower edge of each of the metal plates having a felt strip secured to it, said felt strip extending inwardly into the space between the plates so as to contact with the glass closure.

4. In a member having a window opening provided with grooves along the sides and across the top, a strip of felt extending along each side of the groove and a glass closure slidable in the grooves between the felt strips, a ventilator comprising two elongated metal plates, one being located on each side of the groove between the groove surface and the adjacent felt strip, each of said plates having a plurality of elongated openings formed by making cuts and pressing the metal along one side of each cut outwardly, whereby openings are formed that lie in a plane substantially perpendicular to the plane of the plate, the openings in the outside plate opening downwardly and those in the inside plate upwardly and a felt strip secured to each plate along the lower edge, the felt strips being located on the inside so as to contact with the glass closure when the latter is moved into position between the plates.

In testimony whereof I affix my signature.

LEON RANSOM SMITH.